Figure 1:
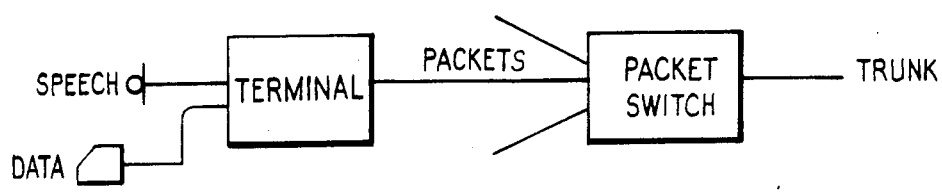

United States Patent [19]

Weir, deceased et al.

[11] Patent Number: 4,707,831
[45] Date of Patent: Nov. 17, 1987

[54] PACKET SWITCHING SYSTEM

[75] Inventors: Donald A. Weir, deceased, late of Goff's Oak, England, by Jean C. Weir, executrix; William A. G. Walsh, Hertford Heath; Richard C. Slatter, Watton at Stone both of England

[73] Assignee: STC plc, London, England

[21] Appl. No.: 790,560

[22] Filed: Oct. 23, 1985

[30] Foreign Application Priority Data

Oct. 25, 1984 [GB] United Kingdom ............... 8426955

[51] Int. Cl.⁴ .................. H04J 3/24; H04Q 3/00
[52] U.S. Cl. .................................. 370/94; 370/60; 370/89; 340/825.5
[58] Field of Search .............. 370/60, 94, 84, 89; 340/825.5

[56] References Cited

U.S. PATENT DOCUMENTS 4,433,411 2/1984 Gefroerer et al. .................. 370/94
4,538,259 8/1985 Moore .................................. 370/60

Primary Examiner—Douglas W. Olms
Assistant Examiner—Curtis Kuntz
Attorney, Agent, or Firm—Lee, Smith & Zickert

[57] ABSTRACT

A packet switching system has both speech and data transmitted as packets over virtual connections set-up in a digital network. The speech and data packets are transmitted at the bit rate of the transmission medium. The speech packets, which have to be handled in real-time, are given priority over the data packets, which are relatively long. Because the speech packets may be subjected to unacceptable delay if the medium is busy with a data packet when a speech packet is to be sent, the system provides that, if a speech packet arrives when a data packet is partly sent, the sending of the data packet is interrupted, the speech packet is sent, and the residue of the data packet is sent when the transmission medium is free of speech. This residue is provided with a new header and handled as if it is a new data packet.

5 Claims, 4 Drawing Figures

PACKET SWITCHING SYSTEM

This refers to a transmission system in which both data and speech are conveyed in packet form.

In such a system the intelligence to be conveyed is in digital form and is assembled into packets each of which is a block of intelligence with attached to it handling information including a destination address, and message identification. Where a message contains a number of packets they are sent sequentially, but not necessarily over the same route, from the caller to the wanted user. The handling information includes information which ensures that packets are assembled in the correct order.

In such a system, speech, which is essentially a real-time phenomenon, should be delayed as little as possible, whereas in most cases data is tolerant of some delay. An object of the invention is to provide a packet-switched transmission system in which both data and speech are handled without the speech packets being unduly delayed.

According to the present invention, there is provided an electrical intelligence transmission system, in which both speech and data are transmitted as packets over virtual connections set up in a fully digital network, the speech and data packets being transmitted at the bit rate of the transmission medium, in which speech packets have priority over data packets, in which, if a speech packet for transmission is detected during the transmission of a data packet, the transmission of that data packet is interrupted to allow the speech packet to be conveyed over the transmission medium, and in which, when the medium again becomes free from speech, the non-transmitted part of the interrupted data packet is transmitted as a separate data packet.

Figure 2:
Figure 3:
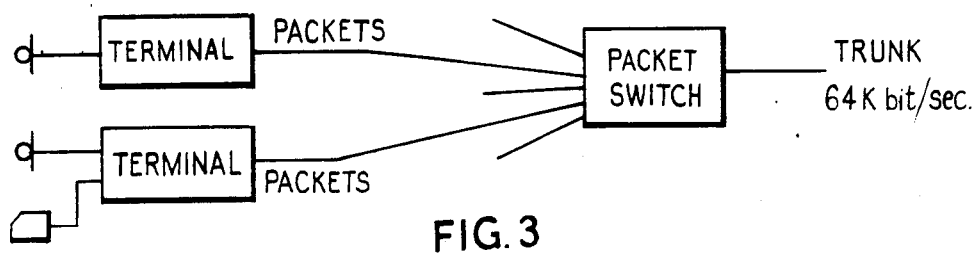
Figure 4:
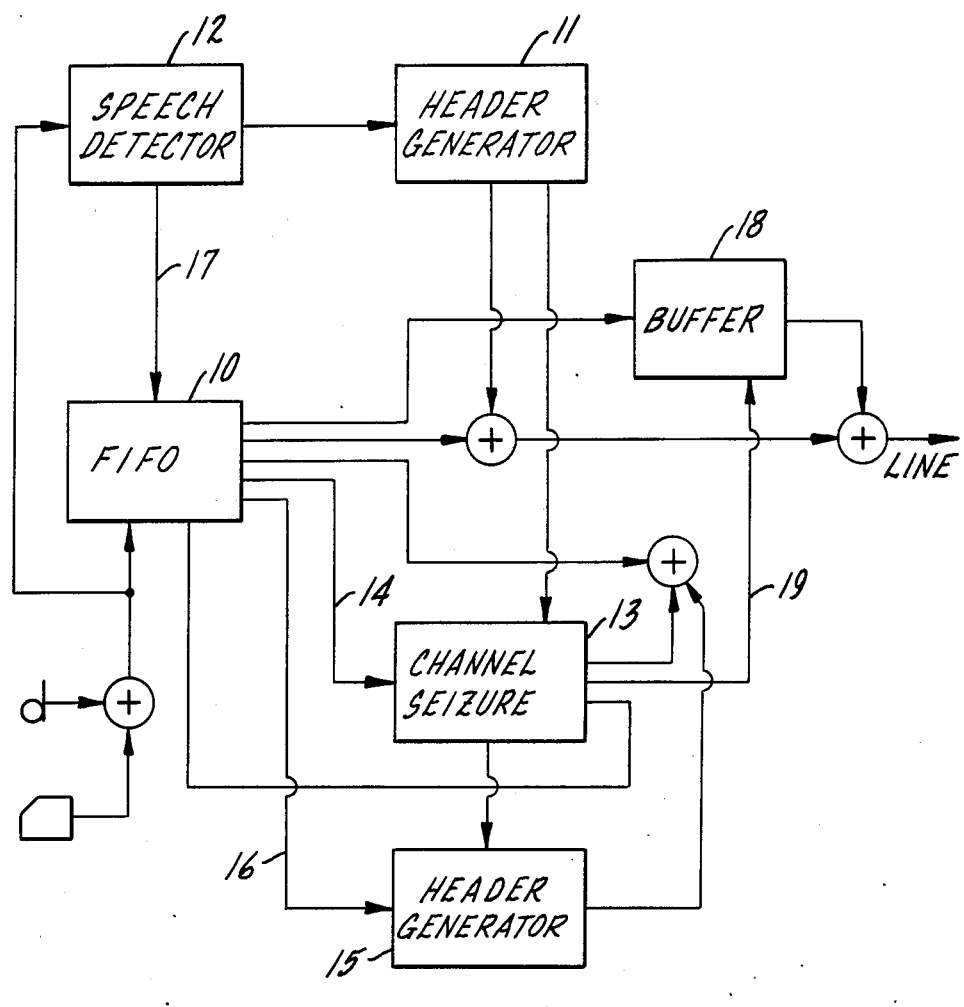

An embodiment of the invention will now be described with reference to the accompanying drawing, in which FIG. 1 is a simplified explanatory block diagram,
FIG. 2 is an intelligence packet of the X25 type, while
FIG. 3 is another simplified block diagram.
FIG. 4 is the main embodiment of the invention.

It is generally accepted that data packets can accept greater delays than speech during transmission, even if the data packets are being handled on an interactive basis. Thus speech should have priority over data at each switching point or node in the network. However, this does not prevent data for which a channel has already been seized from discharging its packet, which may be relatively long.

If, in order to give priority to speech, breakdown of data were involved, this would entail a restart of the data when the speech packet ends, and with a high number of speech users in the network, the delay to data could become important in data periods. In the present system, these difficulties are overcome by artificially ending a data packet being sent when a speech packet has to be sent. The speech packet is then followed by the untransmitted portion of the data packet, preceded by a suitable header, which includes the data packet's address and other handling information.

In assessing the advantages of such a system, it should be understood that the delay to speech due to data packets in a conventional system depends on the speed of transmission of data. Thus if a data packet consists of 1024 bytes, each of eight bits, then at 64 K bit/sec, each packet would take 128 ms to send. This would mean on average a 64 ms. delay to intelligence which follows the packet, which is a substantial delay. If the trunk (or other circuit) involved is a 2 Mbit/sec, then the packet would take 4 ms, which gives an average delay of 2 ms. Hence it will be seen that it is desirable to avoid delay on speech channels. It is very important to avoid such delays on subscribers' lines which may only be able to provide a single or double speech channel and also on low traffic trunks which may be able to provide only 64K bit/sec. Hence the new technique is applicable at either a subscriber's terminal or at the first exchange in the network.

FIG. 1 shows in highly simplified form such as system in which the circuitry is located at the subscriber's terminal. It is assumed that once set up, connections are over virtual circuits, and that the physical medium between the terminal and the packet switch is used in common by all sources at the terminal. A speech detector is provided which monitors the line to identify the presence or absence of speech.

The information to be conveyed, whether speech or data, is processed through a FIFO (first-in-first-out) store. Speech expressed digitally normally flows out of this store immediately after the header has been added, and continues to flow until a suitable pause in the speech occurs, or until the end of a packet length, e.g. 64 bytes, is reached, when a tail is added. If the speech talk-spurt continues without pause, a new packet, with its own header, is initiated.

In the case of data, the FIFO store is filled to the packet capacity, e.g. 1024 bytes, and then a channel, which provides the virtual circuit, is seized. Speech, because of the need to minimise delay, is handled "on the fly", so in a conventional system speech is only subjected to full packet delay when an output channel is unavailable or when the channel currently in use is of higher speed than the source. In the first of these cases, the congestion can be due to another speaker using the channel, or data using the channel.

Congestion may be tolerated if it causes relatively short delay at 64 K bit/sec, i.e. from 0 to 8 ms. However, delay due to a data packet may cause an excessive delay if a speech packet has to wait. Hence when speech is detected while a data packet is being sent, a speech detector responds and terminates the data packet prematurely, providing it with a suitable tail. The speech packet is then provided with a header and transmitted, a tail being appended to it. Then the residue of the interrupted data packet is sent as a new packet, with its own header and tail, which indicate that it is the residue of an interrupted packet. Thus the delay avoided lies, due to the length of a data packet, between 0 and 128 ms, i.e. 64 ms on average. Thus a serious source of delay is avoided at the originating end.

FIG. 2 shows the structure of an X25 data packet used for data, while a speech packet as used in this system is similar with the exception that the FCS (i.e. error detection) check only applies to the header to ensure that delivery of the packet is effected. Note that any packet whose header does not check is rejected.

In FIG. 2 the arrow indicates the direction of transmission. For a data packet the intelligence portion may contain up to 1024 bytes, while for speech it may also contain up to 1024 bytes. It will be seen that the header includes three portions, which in many cases would each consist of one byte, while the rest of the packet is in three portions. These three portions are a three-byte header, the information which may include up to 1024 bytes, and a three-byte tail. Propagation time may vary from nearly zero to as much as 500 ms. Handling is assumed to include the delay at each stage, e.g. a maximum of 7 ms per stage with 2 ms average, plus 1 ms for processing. For a packet of this size this gives a total delay here of 21 ms. Thus the elimination of the delay to speech due to a data-occupied channel has a considerable effect on the overall delay.

FIG. 3 is indicative of the application of the technique described above at the first switching centre. In the case of subscriber lines, the source of data is apparent to the switching centre serving the lines, so the centre can exercise control if the incoming store thereat is not cleared when the data sending terminal is ready to send its next packet. If speech has to be conveyed in preference to data, the centre can terminate the current data packet as explained in connection with control at the subscriber's terminal. The centre has to be advised of the type of traffic being handled; this is conveniently done by using the control bit of a speech packet to give the speech identification to reserve the capacity.

An additional feature of the present arrangement relative to the avoidance of difficulties due to variable delay in the network, and is concerned with means by which the speech packets are time-stamped, i.e. they include an indication of the packet's time of origin. The method used to remove such variable delay is to accept a standard delay for each speech packet which is more than the delay normally expected in the network. Any speech packet whose delay exceeds the standard delay is discarded, while any packet which has less than the standard delay is caused to suffer this delay. This will often mean holding a speech packet in a buffer for the difference between the actual delay and the standard delay. This can readily be effected under clock and microprocessor control.

A modern telecommunication's network has to provide for satellite circuits which have inherently long propagation delays, while terrestial circuits have shorter delays. Hence the standard delay referred to above is not fixed, but is mode dependent on the delay suffered by the connection. This is automatically indicated by the difference between the time-stamp of a received packet and the time of reception thereof. Since the reassembly of the speech from the packets, with pause introductions where appropriate, is done at the receiving terminal, it is only the receiving terminal which needs to know the time-stamp. Therefore, it is transmitted with the packet, as mentioned above, and can conveniently be conveyed as the first part of the information. The degree of accuracy needed might be to 1ms, and would cover the period of one second, which should never be exceeded. Thus two bytes of the information can be allocated to the time-stamp, expressed duo-decimal or pure binary.

FIG. 4 of the drawing shows a block diagram of an embodiment of the invention in greater detail. The information to be conveyed, whether speech or data, is processed through a FIFO (first-in-first-out) store 10. Speech in digital form, in which it may be received from the subscriber's telephone, normally flows out of this store immediately after a header has been added. This is effected by a header generator 11, which is triggered by a speech detector 12. This latter monitors the incoming bit stream, and responds to digitally represented speech to operate the header generator and via that to cause the header to be added before the speech leaves the FIFO for the line. Speech continues to flow in this manner until a pause in the speech is noted, or until the end of a speech packet—e.g. 64 bytes, is reached, when a tail is added by the header generator 11. If the speech talk-spurt continues without pause, a new packet with its own header is initiated.

In the case of data the FIFO store 10 is filled to the packet capacity, e.g. 1024 bytes, and when this occurs, a Channel Seizure channel 13 is enabled via a connection 14. This circuit 13 then seizes a free outgoing channel which provides the virtual circuit. This seizure, plus another output from the FIFO 10 enables another header generator 15 via a connection 16 to provide a header for the data packet. This header is sent to line, after which the FIFO 10 is enabled via a connection 17 to send the data packet to line.

If speech is detected while a data packet is being sent, speech detector 12 responds and via connection 17 terminates the data packet. This termination, via the connection 14 to the block 13 and via the connection therefrom to the generator 15 provides a tail for the interrupted packet. The remainder of the data packet is then driven out of the FIFO 10 to a buffer 18, where it remains until the speech packet ends.

When the speech packet ends, the provision of the tail from the generator 11 is noted by the channel seizure circuit 13. This latter has "remembered" that a data packet was interrupted, so it causes another header to be supplied from the generator 15, whereafter the contents of the buffer 18 are driven out in response to a signal over the connection 19. This is followed as usual by the data packet's tail.

While the present invention has been described in connection with a preferred embodiment thereof, it is to be understood that additional embodiments, modifications, and applications which will become obvious to those skilled in the art are included within the spirit and scope of the invention as set forth by the claims appended hereto.

What is claimed is:

1. In an electrical intelligence transmission system in which both speech and data are transmitted as packets over virtual connections set up in a digital switching network, with both said speech and data packets being transmitted at a given bit rate associated with said transmission system wherein transmitted speech packets cannot undesirably be unduly delayed as being a real time phenomenon while data packets can be transmitted at greater delays, in combination therewith of apparatus in assigning speech packets greater priority than data packets, comprising:

first storage means responsive to both speech and data packets for storing the same prior to transmission via said network, means coupled to said storage means for seizing an available channel for transmitting said stored packets, means for detecting said packets to provide an output when a speech packet is detected, to terminate the further storage of data packets upon said detection of a speech packet and to enable said first storage means to store data packets during the absence of a speech packet, second storage means coupled to said first storage means and operative to store any data packets in said first storage means upon the detection of said speech packet and enabling the transmission of said stored data packet when speech packets are not detected, whereby speech packets are transmitted on said channel with priority to data packets to enable speech packets to always be promptly transmitted when an available channel is seized.

2. The apparatus according to claim 1, wherein said first storage means is a First In First Out (FIFO) store having an input coupled to a data line for receiving speech or data packets.

3. The apparatus according to claim 2, wherein said second storage means is a buffer having an input coupled to the output of said FIFO store and operative to store the contents of said FIFO store therein.

4. The apparatus according to claim 1, wherein said means for detecting said packets includes a first header generator operative upon detection of a speech packet to provide a speech header indicator to speech packets upon detection of speech packets by speech detector means included in said means for detecting.

5. The apparatus according to claim 4, further including:
a second header generator having an input coupled to said first storage means and operative to provide a data header indicator to data packets including a tail header upon the termination of a data packet.

* * * * *